United States Patent
Jeon et al.

(10) Patent No.: US 7,737,958 B2
(45) Date of Patent: Jun. 15, 2010

(54) TOUCH SCREEN DEVICE AND METHOD OF DISPLAYING AND SELECTING MENUS THEREOF

(75) Inventors: Byeong Hui Jeon, Chungcheongnam-do (KR); Sang Hyun Shin, Seoul (KR); Ho Joo Park, Seoul (KR); Yu Mi Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 572 days.

(21) Appl. No.: 11/646,604

(22) Filed: Dec. 28, 2006

(65) Prior Publication Data

US 2007/0250786 A1    Oct. 25, 2007

(30) Foreign Application Priority Data

Apr. 19, 2006  (KR) ................ 10-2006-0035443
May 24, 2006  (KR) ................ 10-2006-0046716

(51) Int. Cl.
*G06F 3/048* (2006.01)

(52) U.S. Cl. .............. 345/173; 345/174; 345/169; 345/156; 715/810

(58) Field of Classification Search ........ 345/173–178, 345/104; 257/225–234, 431
See application file for complete search history.

(56) References Cited

U.S. PATENT DOCUMENTS

| | | | |
|---|---|---|---|
| 5,140,678 A | 8/1992 | Torres | |
| 5,191,645 A | 3/1993 | Carlucci et al. | |
| 5,495,566 A | 2/1996 | Kwatinetz | |
| 5,523,775 A | 6/1996 | Capps | |
| 5,526,011 A | 6/1996 | Hix et al. | |
| 5,548,705 A | 8/1996 | Moran et al. | |
| 5,586,235 A | 12/1996 | Kauffman | |
| 5,592,608 A | 1/1997 | Weber et al. | |
| 5,596,699 A | 1/1997 | Driskell | |

(Continued)

FOREIGN PATENT DOCUMENTS

EP    1 037 135    9/2000

(Continued)

OTHER PUBLICATIONS

Indian Office Action dated Nov. 16, 2009.

(Continued)

*Primary Examiner*—Richard Hjerpe
*Assistant Examiner*—Jeffrey Steinberg
(74) *Attorney, Agent, or Firm*—KED & Associates, LLP

(57) ABSTRACT

A touch screen device and method for displaying and selecting menus thereof are provided. The touch screen device includes a screen with a display for displaying menu images thereon and a detector for detecting a touch on a screen, and a controller which displays one or more menu bars on the screen. Each of the menu bars may have an expanded portion at one end thereof, and the menu bars may be displayed such that the expanded portions are arranged in a zigzag pattern to facilitate menu selection and reduce input errors. When two or more menu bars are erroneously touched, the controller may enlarge and display the touched menus so that a new touch input for the correct menu can be easily made. Thus, menus displayed on the touch screen may be arranged for easy selection, and input errors may be easily corrected.

8 Claims, 10 Drawing Sheets

U.S. PATENT DOCUMENTS

| | | | |
|---|---|---|---|
| 5,757,368 | A | 5/1998 | Gerpheide et al. |
| 5,796,406 | A | 8/1998 | Shigematsu et al. |
| 5,821,936 | A | 10/1998 | Shaffer et al. |
| 5,831,616 | A | 11/1998 | Lee |
| 6,094,197 | A | 7/2000 | Buxton et al. |
| 6,097,387 | A | 8/2000 | Sciammarella et al. |
| 6,107,997 | A | 8/2000 | Ure |
| 6,259,436 | B1 | 7/2001 | Moon et al. |
| 6,310,615 | B1 | 10/2001 | Davis et al. |
| 6,334,003 | B1 | 12/2001 | Yokota |
| 6,459,442 | B1 | 10/2002 | Edwards et al. |
| 6,476,796 | B1 | 11/2002 | Kuzunuki et al. |
| 6,525,749 | B1 | 2/2003 | Moran et al. |
| 6,560,281 | B1 | 5/2003 | Black et al. |
| 6,724,370 | B2 * | 4/2004 | Dutta et al. ............... 345/169 |
| 6,753,892 | B2 * | 6/2004 | Chung ..................... 715/810 |
| 6,765,557 | B1 * | 7/2004 | Segal et al. ............... 345/173 |
| 6,883,140 | B1 | 4/2005 | Acker et al. |
| 6,883,145 | B2 | 4/2005 | Jaeger ..................... 715/767 |
| 6,900,835 | B2 | 5/2005 | Cazier et al. |
| 6,940,494 | B2 | 9/2005 | Hoshino et al. |
| 6,957,395 | B1 | 10/2005 | Jobs et al. |
| 6,958,749 | B1 | 10/2005 | Matsushita et al. |
| 6,965,377 | B2 * | 11/2005 | Yanagisawa et al. ........ 345/173 |
| 7,015,932 | B1 | 3/2006 | Koike et al. |
| 7,031,756 | B1 * | 4/2006 | Sim et al. ................. 455/566 |
| 7,035,720 | B2 | 4/2006 | Taxis |
| 7,046,230 | B2 * | 5/2006 | Zadesky et al. ........... 345/156 |
| 7,047,503 | B1 | 5/2006 | Parrish et al. |
| 7,158,913 | B2 | 1/2007 | Park et al. |
| 7,162,685 | B2 | 1/2007 | Saito |
| 7,164,410 | B2 | 1/2007 | Kupka |
| 7,164,432 | B1 | 1/2007 | Amemiya |
| 7,242,323 | B2 | 7/2007 | Sato et al. |
| 7,345,671 | B2 * | 3/2008 | Robbin et al. ............. 345/156 |
| 7,348,967 | B2 | 3/2008 | Zadesky et al. ........... 345/173 |
| 7,406,666 | B2 | 7/2008 | Davis et al. |
| 7,434,177 | B1 | 10/2008 | Ording et al. |
| 7,456,823 | B2 * | 11/2008 | Poupyrev et al. .......... 345/173 |
| 7,469,388 | B1 | 12/2008 | Baudisch et al. |
| 7,509,588 | B2 | 3/2009 | Van Os et al. |
| 2002/0149569 | A1 | 10/2002 | Dutta et al. |
| 2003/0076306 | A1 | 4/2003 | Zadesky et al. |
| 2003/0142123 | A1 | 7/2003 | Malamud et al. |
| 2003/0174149 | A1 | 9/2003 | Fujisaki et al. |
| 2004/0095395 | A1 | 5/2004 | Kurtenbach |
| 2005/0024341 | A1 | 2/2005 | Gillespie et al. |
| 2005/0047629 | A1 | 3/2005 | Farrell et al. |
| 2005/0176502 | A1 | 8/2005 | Nishimura et al. |
| 2005/0251748 | A1 | 11/2005 | Gusmorino et al. |
| 2006/0013079 | A1 | 1/2006 | Rekimoto |
| 2006/0026536 | A1 | 2/2006 | Hotelling et al. |
| 2006/0085767 | A1 | 4/2006 | Hinckley et al. |
| 2006/0256091 | A1 | 11/2006 | Hino |
| 2006/0271947 | A1 | 11/2006 | Lienhart et al. |
| 2007/0018968 | A1 | 1/2007 | Iwamoto et al. |
| 2007/0075980 | A1 * | 4/2007 | Hsieh et al. ................. 345/173 |
| 2007/0136690 | A1 | 6/2007 | MacLaurin et al. |
| 2007/0150842 | A1 | 6/2007 | Chaudhri et al. |
| 2007/0180392 | A1 | 8/2007 | Russo |
| 2008/0150905 | A1 | 6/2008 | Grivna et al. |
| 2009/0119613 | A1 | 5/2009 | Nakaya |

FOREIGN PATENT DOCUMENTS

| | | |
|---|---|---|
| GB | 2329813 | 3/1999 |
| JP | 05-158616 | 6/1993 |
| JP | 2002041242 | 2/2002 |
| TW | 200410853 | 7/2004 |
| WO | WO 00/38042 | 6/2000 |
| WO | WO 00/75766 | 12/2000 |
| WO | WO2005/073954 | 8/2005 |

OTHER PUBLICATIONS

Office Action dated Nov. 13, 2009 for U.S. Appl. No. 11/646,613.
Office Action dated Nov. 13, 2009 for U.S. Appl. No. 11/785,405.
Office Action dated Sep. 18, 2009 for U.S. Appl. No. 11/646,586.
Office Action dated Nov. 3, 2009 for U.S. Appl. No. 11/785,402.
Office Action dated Nov. 13, 2009 for U.S. Appl. No. 11/646,587.
Office Action dated Dec. 4, 2009 for U.S. Appl. No. 11/785,401.
European Search Report for EP 07 10 0400 dated Oct. 20, 2010.
U.S. Office Action for U.S. Appl. No. 11/785,403 dated Jan. 7, 2010.
U.S. Office Action issued in U.S. Appl. No. 11/646,613 dated Feb. 2, 2010, superceded by Office Action issued and Mar. 8, 2010.
U.S. Office Action issued in U.S. Appl. No. 11.785,400 dated Feb. 4, 2010.
U.S. Office Action issued in U.S. Appl. No. 11/646,586 dated Mar. 10, 2010.
Andrew Sears and Ben Shneiderman Split menus: Effectively using selection frequency to organize menus ACM Transactions on Computer-Human Interaction, vol. 1, No. 1, Mar. 1994, pp. 27-51.
U.S. Office Action issued in U.S. Appl. No. 11/646,597 dated Mar. 8, 2010.
U.S. Office Action issued in U.S. Appl. No. 11/646,598 dated Feb. 26, 2010.
U.S. Office Action issued in U.S. Appl. No. 11/646,585 dated Mar. 18, 2010.
Taiwanese Office Action issued in TW Application No. 095147947 dated Dec. 29, 2009.
Article by Greg Scoblete, Sandisk Introduces Flash Drives, MP3 Players, TWICE, Jan. 20, 2006, 21, 3; Research Library, p. 4.
SanDisk Sena™ e200 User Guide.
U.S. Office Action issued in U.S. Appl. No. 11/785,404 dated Mar. 25, 2010.
U.S. Office Action issued in U.S. Appl. No. 11/785,399 dated Apr. 1, 2010.

* cited by examiner

TOUCH SCREEN DEVICE AND METHOD OF DISPLAYING AND SELECTING MENUS THEREOF

BACKGROUND

1. Field

A touch screen device method of displaying menus on a touch screen device are disclosed herein.

2. Background Art

Generally, electronic devices are provided with a menu screen to allow a user to easily use the functions provided by the device. Since a single device typically provides a variety of services and functions, menu screen(s) and the related menu information is necessary, and a variety of methods for more easily executing the functions provided by the menus are continuously being developed and introduced. A menu structure typically includes a main menu where functions are classified by categories, and submenus linked to respective menu items of the main menu. A listing of favorite menus may be provided such that frequently used functions can be easily accessed.

Since portable information terminals must be small enough in overall size to be easily carried, conventional key button input methods are difficult to use. As such, a touch screen method may be employed, which uses a finger or stylus pen for the selection and input of information to improve the convenience and ease of use of portable information terminals.

However, due to the size of most portable information terminals, a plurality of menu bars are inevitably displayed close together on the touch screen making it difficult to accurately select a desired menu, resulting in touch errors and/or erroneous selections.

Further, when such an error occurs, there is no way to correct the error. That is, a user must typically first execute an undesired function before returning to an earlier menu to correct the error, or the touch screen does not respond to the user's input when the touch error occurs.

BRIEF DESCRIPTION OF THE DRAWINGS

Embodiments will be described in detail with reference to the following drawings in which like reference numerals refer to like elements wherein.

DETAILED DESCRIPTION

Figure 1:
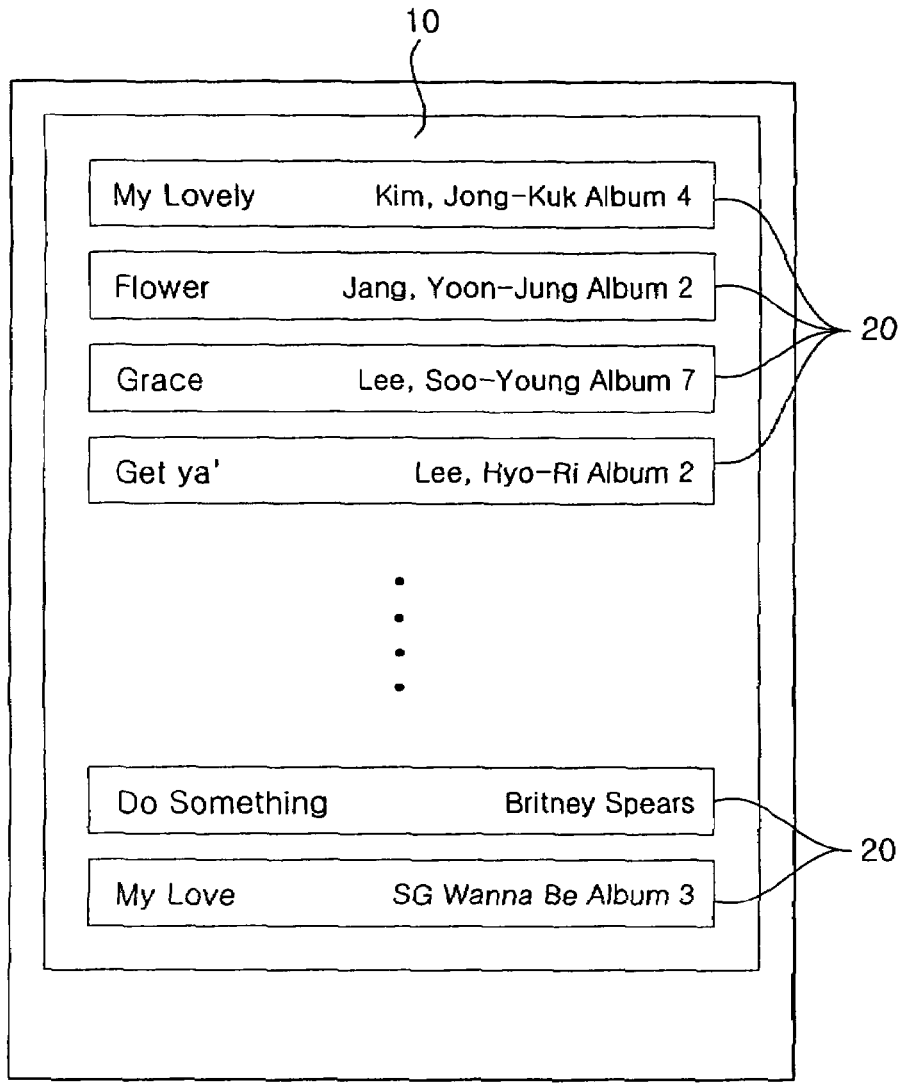
FIG. 1 is an exemplary illustration of menu bars displayed on a touch screen of a portable information terminal device.

FIG. 1 shows a touch screen of a portable information terminal, with menu selection bars 20 for selecting specific functions displayed relatively close together on a screen 10. In this particular example, all of the menu selection bars 20 are the same size, and thus a touch error may occur when a user touches a certain menu selection bar 20, using a finger or other such selecting device, to execute a certain function.

Figure 2:
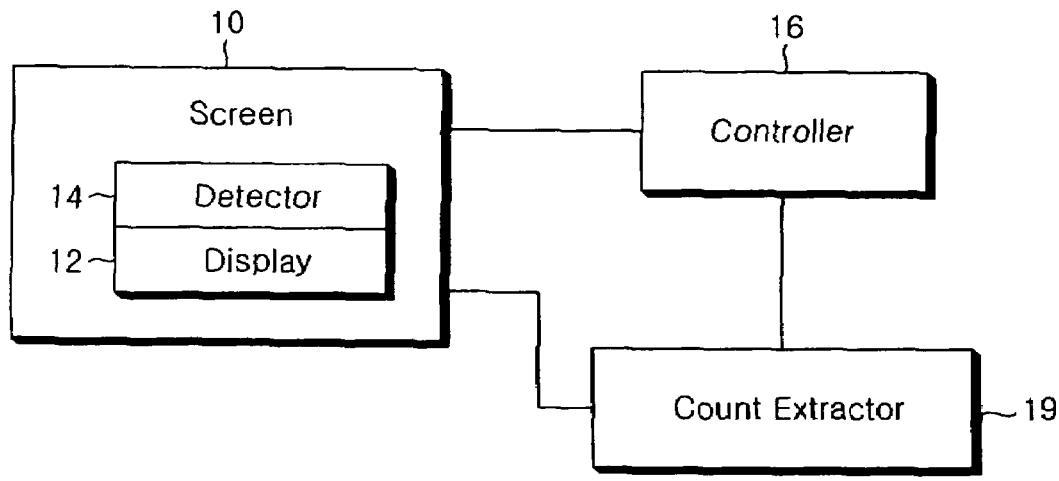
FIGS. 2 and 3 are block diagrams of a touch screen device, in accordance with embodiments.

A block diagram of a touch screen device in accordance with an embodiment is shown in FIG. 2. The touch screen device may include a screen 10 which allows for input and display of information. The screen 10 may include a display 12 for displaying a variety of menu related information and data thereon, and a touch panel or detector 14 for detecting a touching action related to selecting menus or data displayed on the display 12. It is understood that a touch may be any type of direct or indirect touch or contact made by an appropriate touching implement. Thus, when a user touches the screen 10 to select the menus or data displayed on the display 12 using a touching implement, such as, for example, a finger, a stylus pen and the like, the detector 14 may detect whether the screen 10 has been touched.

The display 12 may be any type of general screen display device, including, but not limited to, display devices such as, for example, a liquid crystal display (LCD), plasma display panel (PDP), light emitting diode (LED) or organic light emitting diode (OLED). The detector 14 may be a thin layer provided on a surface, such as a front surface, of the display 12, and may employ a resistive or capacitive method. A touch screen that utilizes infrared rays or the like may also be used.

In the case of a resistive touch screen, the resistive touch screen may include two layers coated with resistive materials positioned at a constant interval, with electric currents supplied to both layers. If pressure is applied to one of the layers, causing the layer to come into contact with the other layer, an amount of electric current flowing along the layers may be changed at the contact point, and a touch point thus detected based on the change in electric current. In contrast, in the case of a capacitive touch screen, the capacitive touch screen may include a glass layer with both surfaces coated with conductive metal. Electric voltage is applied to edges of the glass, causing high frequencies to flow along the surface of the touch screen. A high frequency waveform may be distorted when pressure is applied to the surface of the touch screen, and thus, a touch point detected by changes in the waveform.

The screen 10 may be connected to a controller 16. The controller 16 may control access to user command(s) corresponding to menu(s) selected based the detection results of the detector 14, or data such as, for example, additional information, messages and the like from a storage device (not shown), as well as the execution and/or display of the command or data onto the screen 10. The controller 16 may control not only the display 12, but also the overall operation of the digital equipment in which it is installed, based on the detection results of the detector 14.

Figure 3:
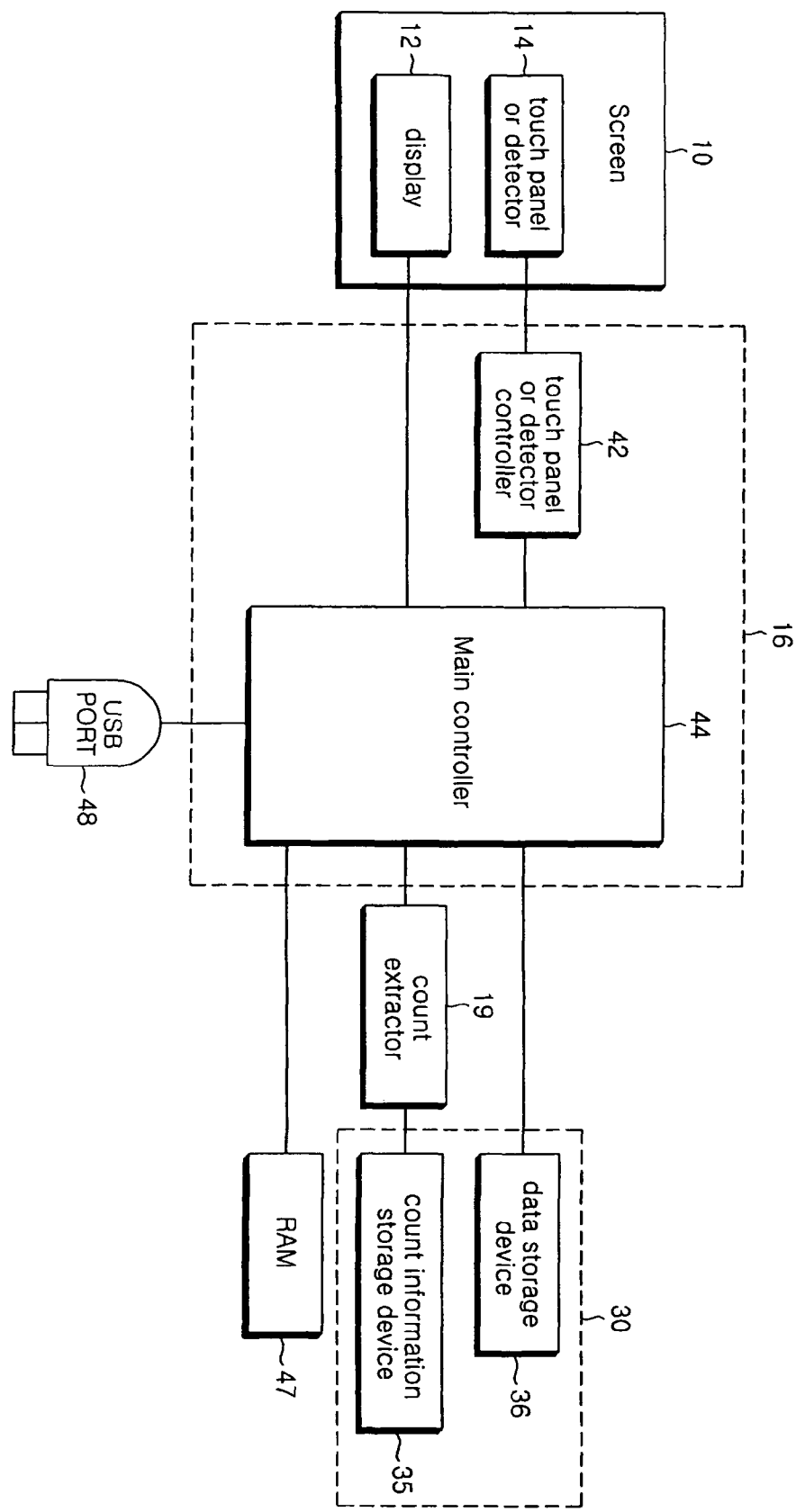

FIG. 3 is a block diagram of a touch screen device according to any embodiment in more detail. As shown in FIG. 3, the screen 10 includes a touch panel or detector 14 and a display 12. The display 12 may be, for example, a thin film transistor liquid crystal display (TFT-LCD) or another type of display device, as appropriate.

The touch panel or detector 14 is connected to a touch panel or detector controller 42 which may convert a user's touch detected on the touch panel or detector 14 into a corresponding signal. The touch panel or detector controller 42 may allow a change in an amount of electric current or high frequency waveform corresponding to an input position on the touch panel or detector 14 to be converted into a digital signal. The display 12 and the touch panel or detector controller 42 may be connected to a main controller 44, and each operate under the control of the main controller 44. The main controller 44 may receive information on a touch point from the touch panel or detector controller 42 and check a menu displayed at the touch point. Then, the main controller 44 may execute the relevant menu, and also notify a count extractor 19 that the menu has been selected.

The count extractor 19 may receive information on the menu selected by the main controller 44 and update (i.e., increases) a count number of that menu, accordingly. The count extractor 19 may be provided within a microchip of the main controller 44, or may be a separate microchip. Alternatively, the count extractor 19 may be a single module together with a count information storage device 35 for storing the count information.

A data storage device 36 for storing a variety of information, and, in the case of an MP3 player, executable files, such as MP3 files, and the like, may be connected to the main controller 44. In certain embodiments, a NAND memory capable of rapidly and easily storing and reading out a large amount of information may be used as the data storage device 36. Other types of memory may also be appropriate. A portion of the data storage device 36 may be used as the count information storage device 3; however, use of a separate count information storage device 35 may be advantageous. For example, the count information storage device 35 may be a NOR memory that is relatively superior in the stability of information. The count information storage device 35 and the data storage device 36 may be part of a storage device 30.

An interface, such as, for example, a universal serial bus (USB) port 48 may be connected to the main controller 44 to provide an interface for modifying data. The USB port 48 may be connected to an external device such that count information and the data stored in the data storage device 36 may be updated, deleted, or otherwise modified as necessary. The main controller 44 may also have a random access memory (RAM) 47 for driving the display device. In certain embodiments, a synchronous dynamic RAM (SDRAM) may be used.

Figure 4:
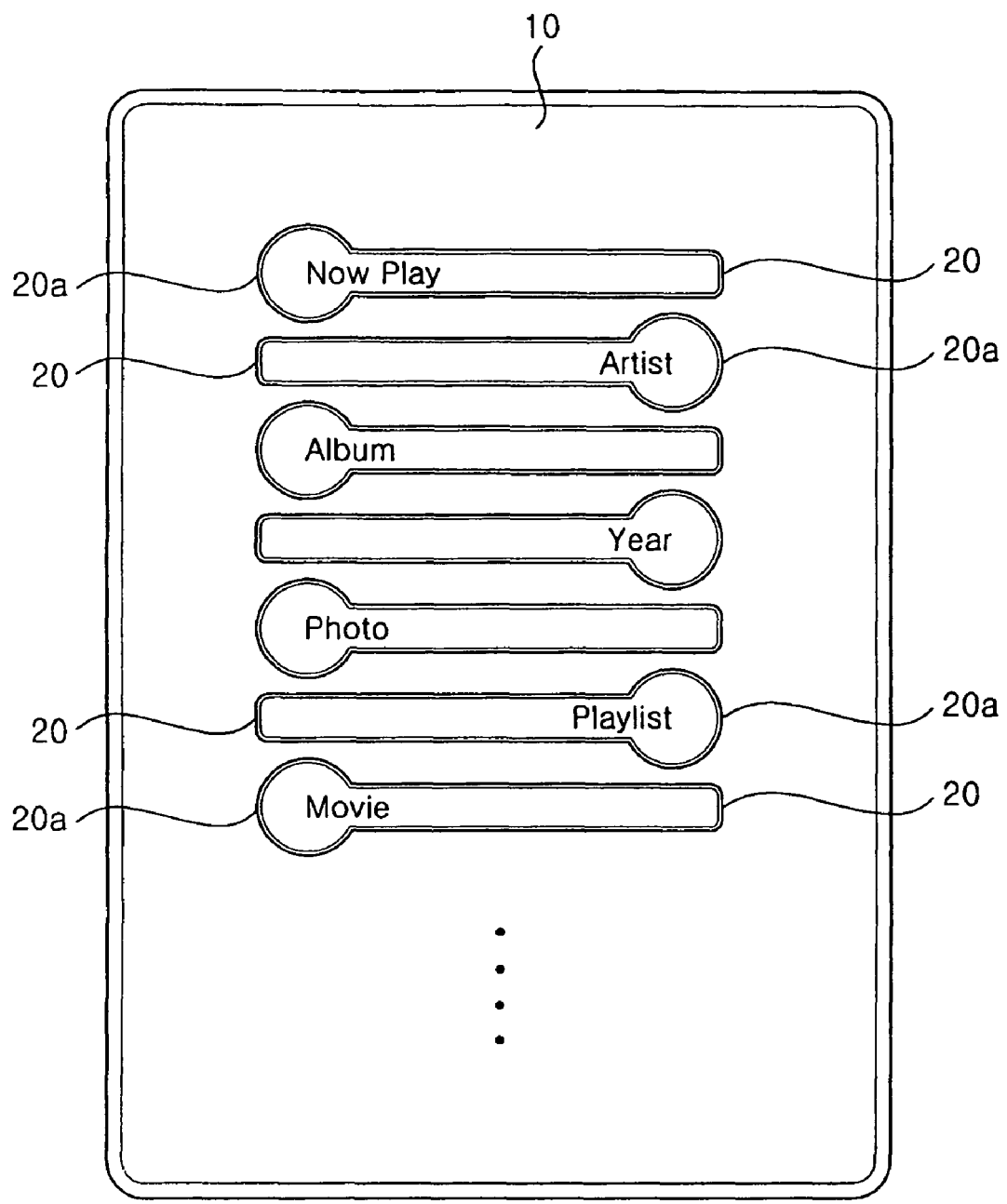
FIG. 4 is an exemplary illustration of menu bars displayed on a touch screen device, in accordance with an embodiment.

As shown in FIGS. 1 and 4, the controller 16 may display the menus using menu bars 20. In the embodiment shown in FIG. 4, each of the menu bars 20 includes an expanded portion 20a at one end thereof such that it can be easily touched with a touching implement, such as, for example, a finger 30 or other such appropriate touching implement. The expanded portions 20a may be arranged in an alternating, or zigzag, pattern, as shown in FIG. 4, to maximize the number of menu bars 20 which may be displayed at one time while still maintaining separation between adjacent expanded portions 20a.

More specifically, as shown in FIG. 4, a menu bar 20 provided with an expanded portion 20a at the left end thereof may be arranged below another menu bar 20 provided with an expanded portion 20a at the right end thereof. Therefore, the expanded portions 20a of the two adjacent menu bars 20 do not come into contact with each other, instead maintaining a degree of separation therebetween. The expanded portion 20a may be a portion on which the touching implement, such as, for example, the finger 30, actually touches. Thus, in certain embodiments, the controller 16 may control the touch screen device to allow a relevant menu to be executed when an input is made through the expanded portion 20a, considered an active portion in this particular instance, but a relevant menu not to be executed when an input is made at a portion of the menu bar 20 other than the expanded portion 20a, considered an inactive portion in this particular instance. In other, alternative embodiments, a bar portion of the menu bars 20, instead of or in addition to the expanded portions 20a, may be active and able to receive input. In still other alternative embodiments, a combination of these may be appropriate, based on a particular application.

The controller 16 may be connected to a count extractor 19 for counting the number of touches on a menu bar 20. More specifically, the count extractor 19 may be connected to the controller 16 and the detector 14 to count the number of touches on the respective menu bars 20 and to provide the controller 16 with the count results. This allows the controller 16 to reconfigure an arrangement of the menu bars 20 based on the data value received from the count extracting unit 19. For example, the count results may cause the most used menu bar 20 to be placed in the most easily accessible location on the touch screen 10. Other arrangements may also be appropriate, based on user preferences.

Further, although for exemplary purposes, the menu bars 20 shown in FIGS. 1 and 4 are shown arranged horizontally on the touch screen 10, is it well understood that an orientation of the menu bars 20 could be adapted based on user preferences. For example, the menu bars 20 could be arranged in a vertical direction, with the expanded portion 20a alternating between a top and a bottom portion of the touch screen 10.

In alternative embodiments, image information indicting a function of the relevant menu bar 20 may be displayed on a portion of the menu bar 20 and/or the expanded portion 20a. This image information may include, for example, text, and/or a variety of icons corresponding to the function of the particular menu bar 20. Likewise, appearance of the menu bars 20/expanded portions 20a may be further altered to include, for example, different colors, shading, outlining and the like to further enhance readability of a menu list may be improved relative to when only the text is displayed.

The controller 16 may also perform a function of correcting input errors when input errors are detected by the detector 14. For example, when touch inputs corresponding to two or more menus, and, in particular, to active areas of two or more menus, are applied to the detector 14, the controller 16 may request clarification/selection of a correct menu 20 so as to correct the input error. A method of correcting input errors will be described in detail when discussing operation of the touch screen device.

Hereinafter, the operation of the touch screen device in accordance with an embodiment broadly described herein will be described in detail with reference to FIG. 5. It is well understood that this method of operation may be applied whether or not the menu bars 20 include expanded portions 20a, and regardless of an orientation of the menu bars 20.

Figure 5:
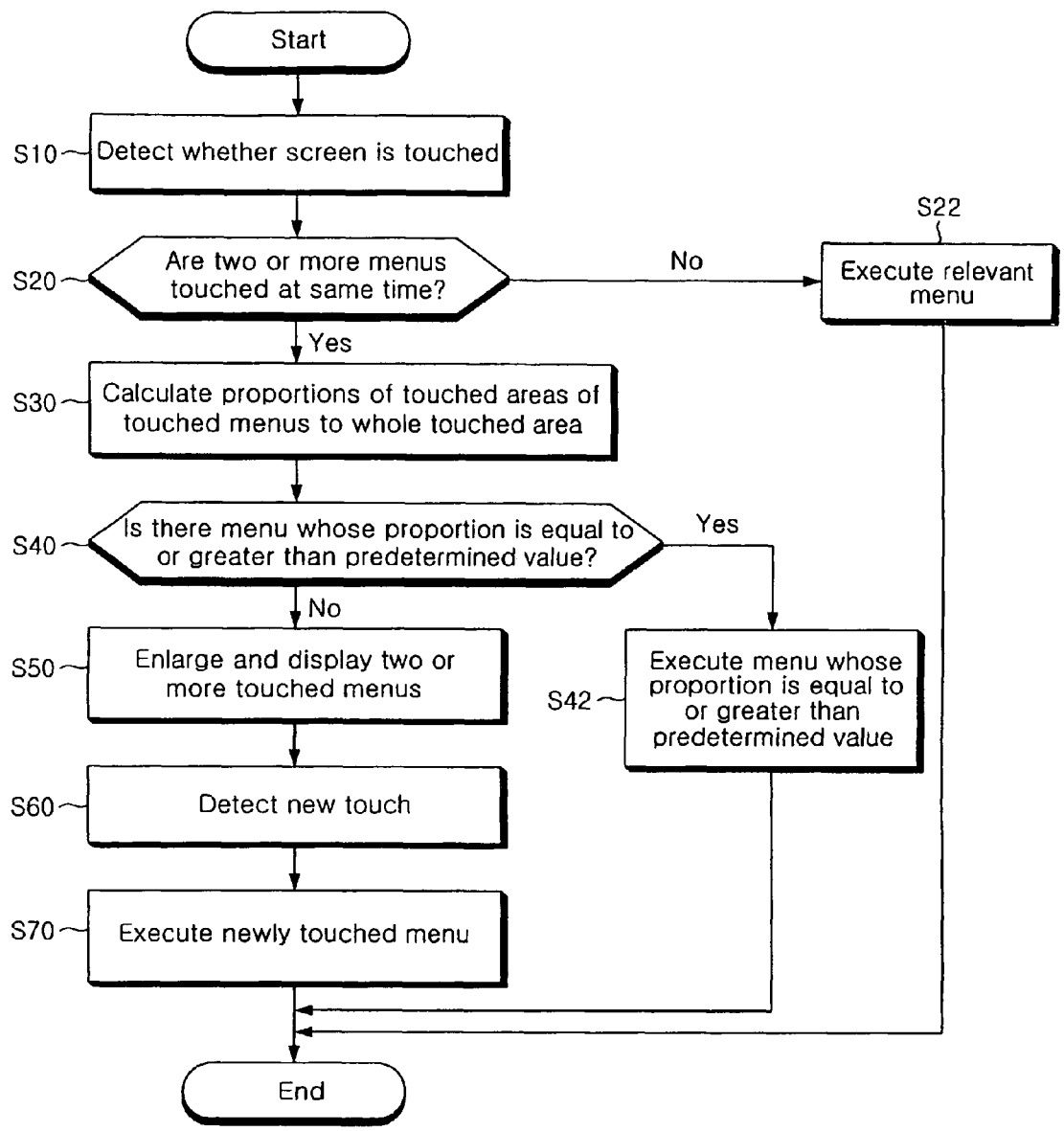
FIG. 5 is a flowchart of a method of displaying and selecting menus on a touch screen device, in accordance with an embodiment.
Figure 6A:
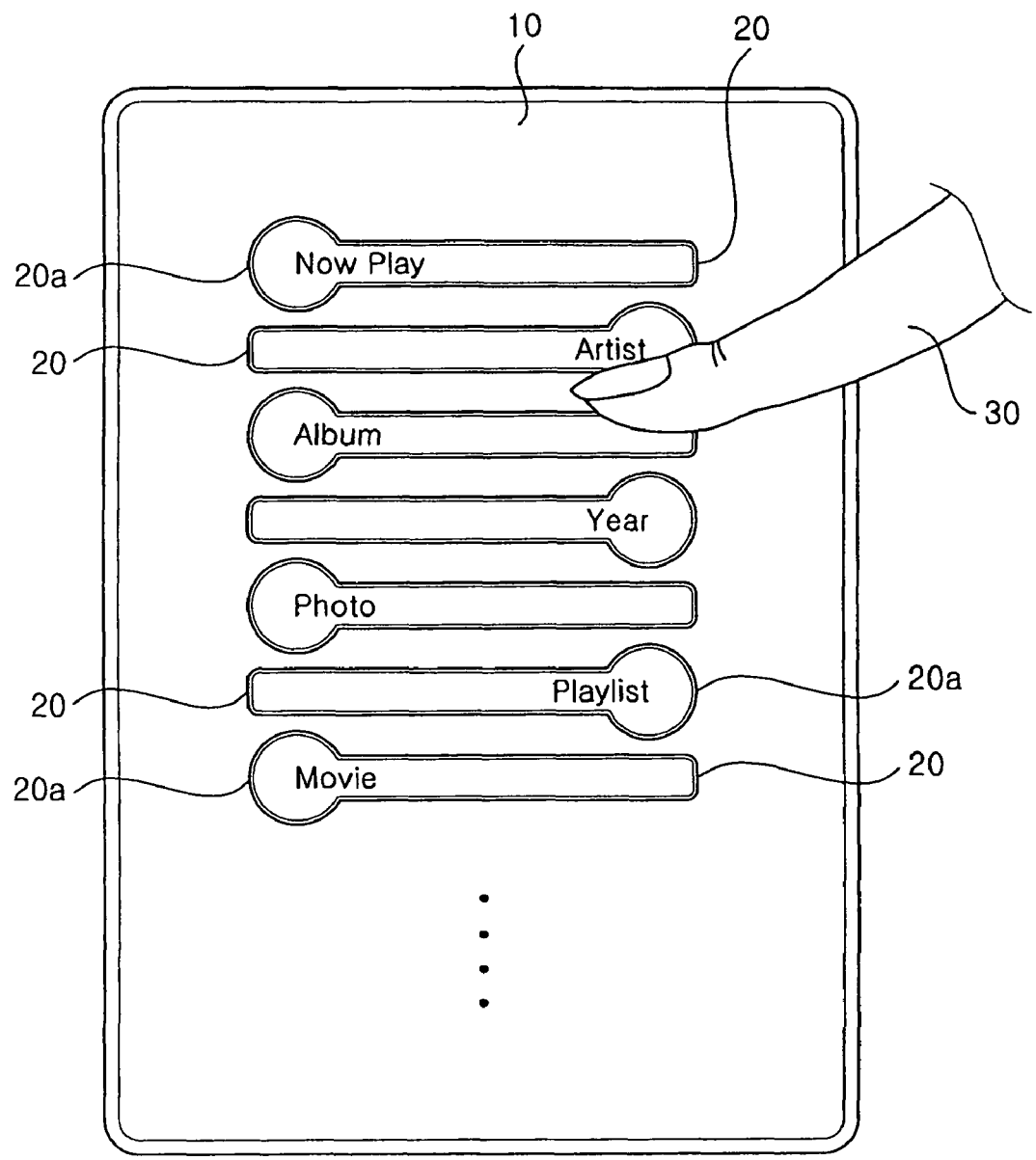
FIGS. 6A-6F are exemplary illustrations of operation of a touch screen device, in accordance with an embodiment.
Figure 6B:
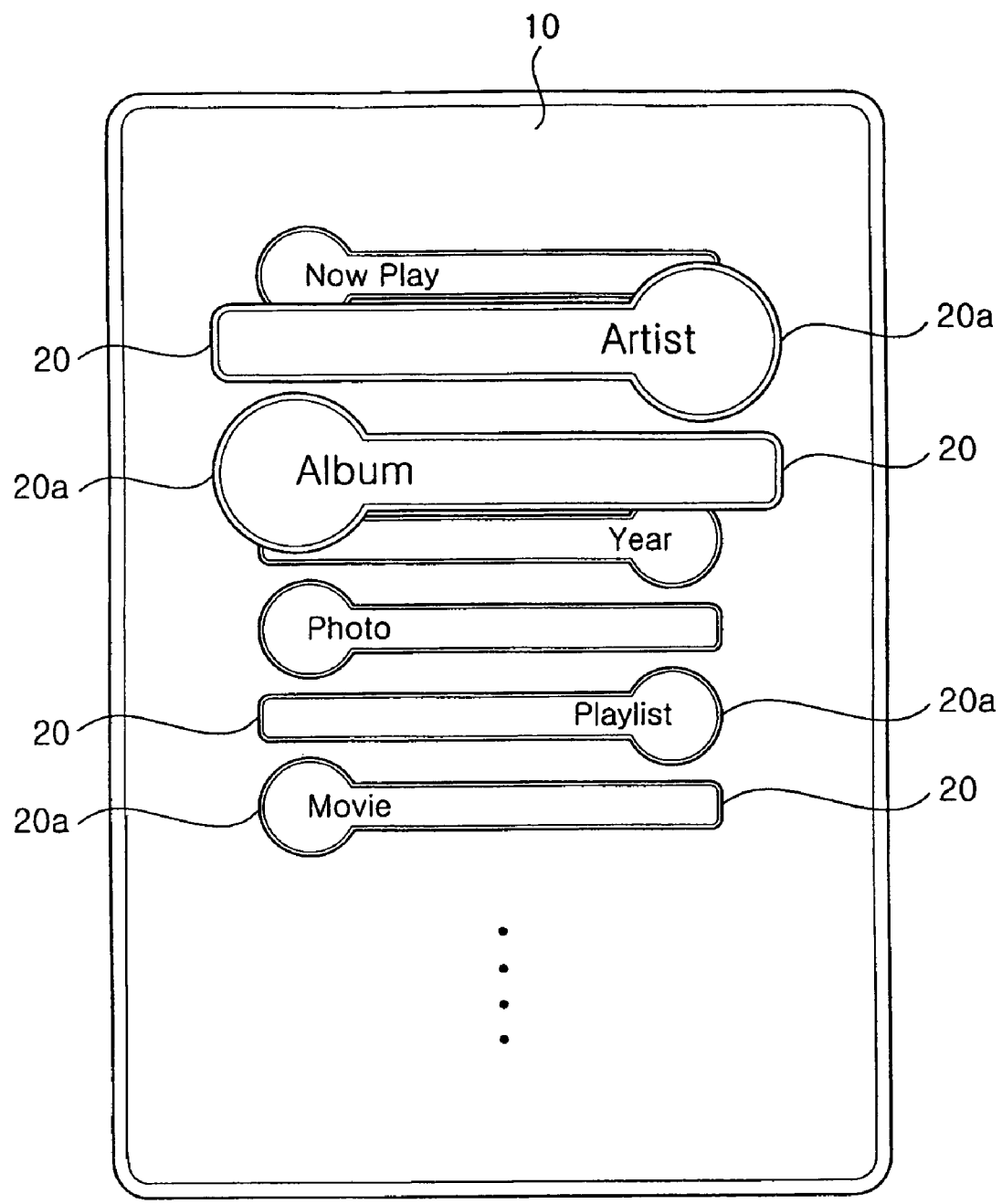
Figure 6C:
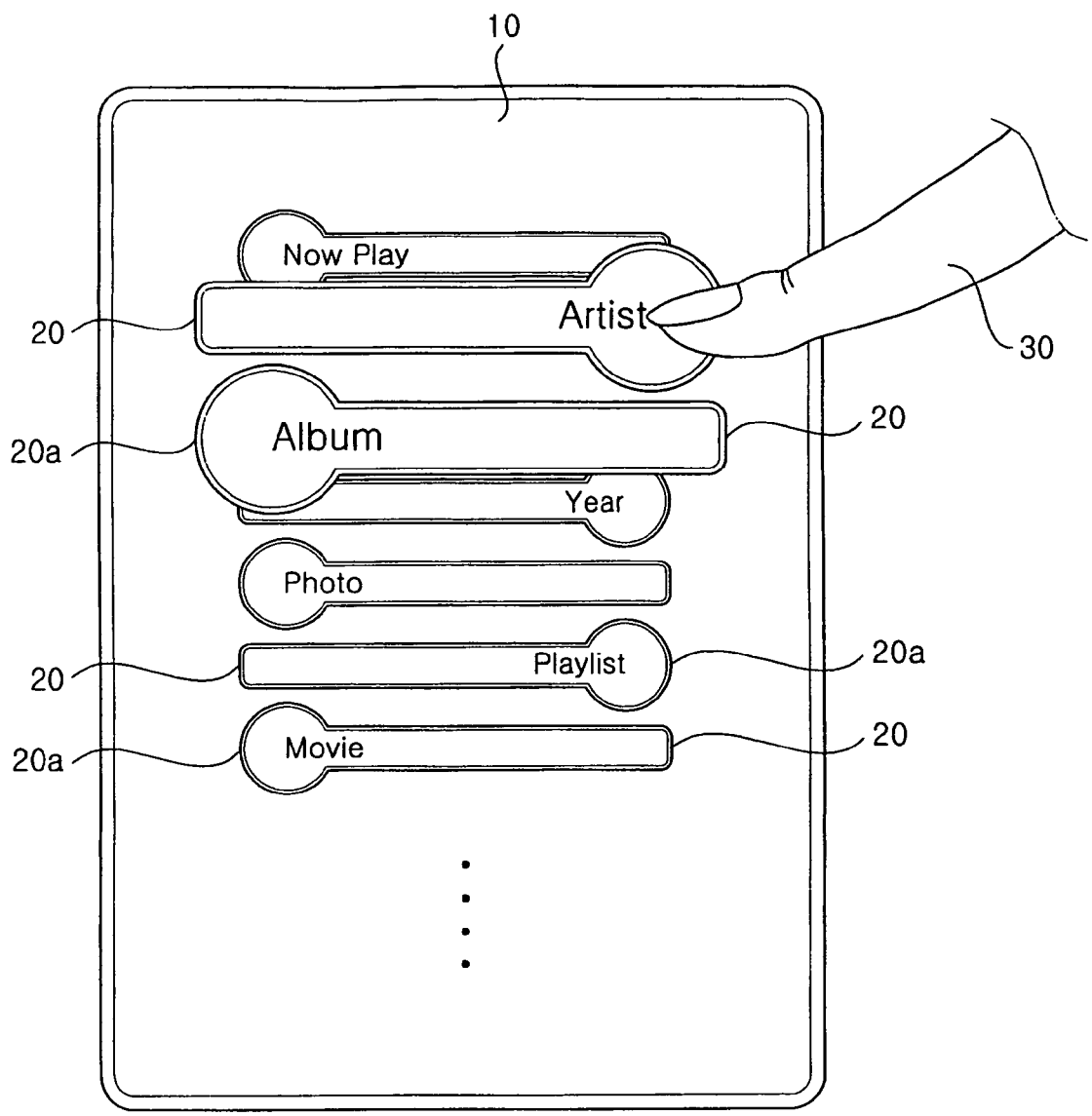
Figure 6D:
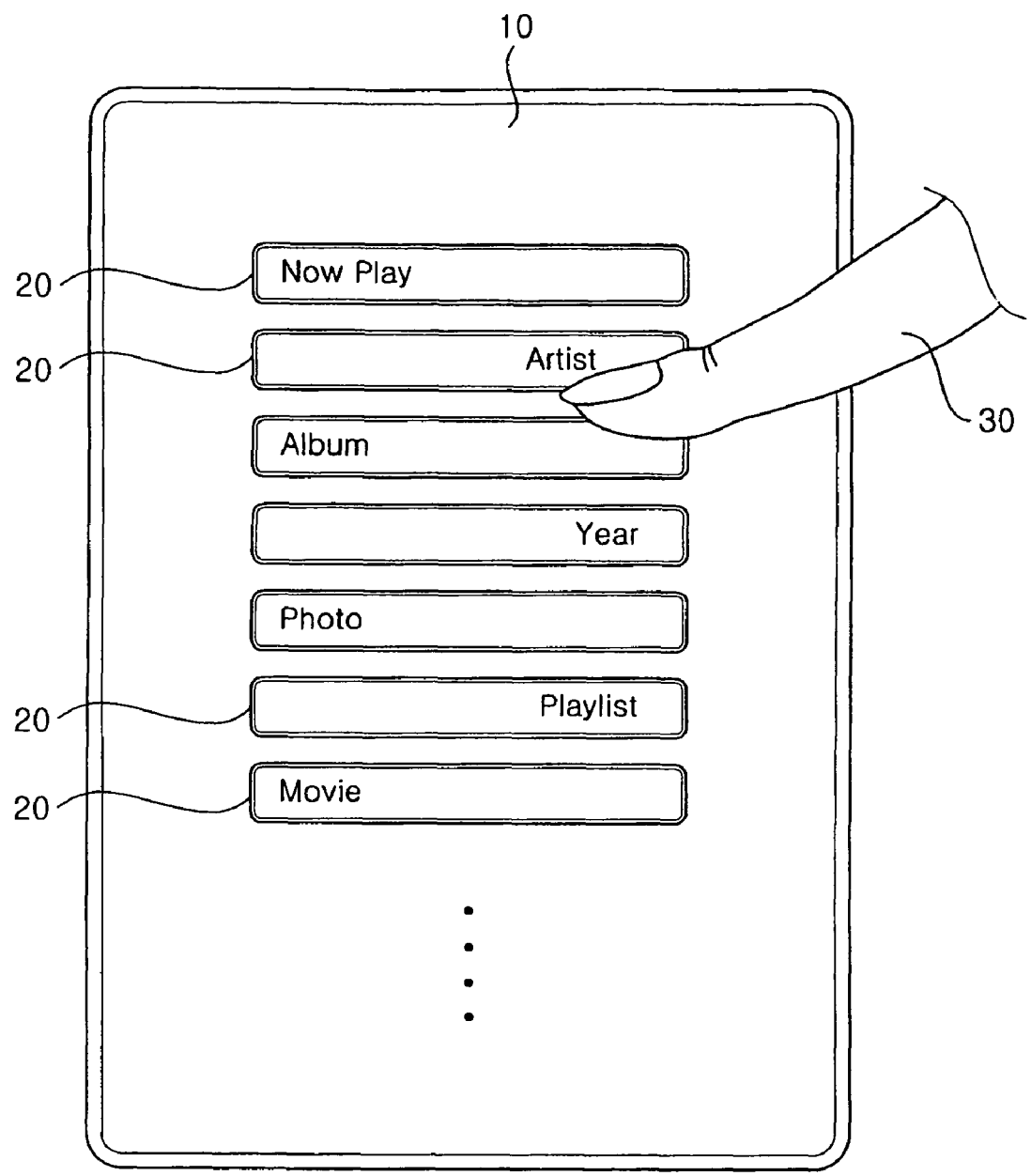

As shown in FIG. 5, the detector 14 may detect a touch on the screen, in step S10. Menus in the form of menu bars 20, either without expanded portions, as shown in FIG. 6D, or with expanded portions 20a, preferably in an alternating, or zigzag pattern, as shown, for example in FIG. 6A, are displayed so that a user may select a desired menu bar 20 by touching the expanded portion 20a. In certain embodiments, a touch input may be made only through the expanded portions 20a, considered active portions of the menu bars 20, in order to minimize input errors.

In alternative embodiments in which the active area includes not only the expanded portion 20a, but also at least a portion of the menu bar 20, or in which the menu bars 20 do not include expanded portions 20a, as shown, for example, in FIGS. 1 and 6D, the controller 16 may operate to detect and correct input errors. More specifically, if the detector 14 detects a touch, the controller 16 may check whether two or more menus are touched at the same time, in step S20, to determine whether there is an input error. If only one menu bar 20/expanded portion 20a is touched, it is a normal input without errors, and thus, a relevant menu may be executed in step S22.

However, if touch inputs are applied to two or more menu bars 20/expanded portions 20a, the controller 16 may calculate proportions of touched areas of the respective touched menu bars 20/expanded portions 20a to the whole touched area, in step S30. This allows the controller 16 to determine that very weakly touched menu bars 20/expanded portions 20a were likely touched in error.

Next, the controller 16 may check whether there is a menu bar 20/expanded portion 20a where more than a predetermined proportion of the whole touch area is contained within an active portion, in step S40. The predetermined proportion may be a value close to 100%. However, the predetermined proportion may be set to other values, such as, for example, a value between 70% and 95. The larger the predetermined proportion is set, the more sensitively the display 12 will respond to an input. However, this increased sensitivity may cause a larger number of false, or incorrect error determinations. On the other hand, a smaller predetermined proportion may result in a simplified input procedure, but sensitivity to the input is lowered.

When there is a menu bar 20 that has a touch area greater than or equal to the predetermined proportion, the controller 16 may recognize that the menu bar 20 has been selected/input, and execute the relevant menu, in step S42. However, when there is no menu bar 20 that has greater than or equal to the predetermined proportion of the whole touch area, the touched menu bars 20 which have been touched, for example, two menu bars 20, as shown in FIGS. 6B, 6C, 6E and 6F, may be enlarged and displayed, in step S50. This is to notify a user that inputs for two menus have been entered and to prompt a new input by the user so as to execute the correct menu. Thereafter, the controller 16 may detect the new touch input, in step S60, and execute a menu corresponding to the new touch input, in step S70.

New touch inputs may be made in a variety of ways. For example, all portions on the touch panel other than the enlarged and displayed menu bar(s) 20 may be rendered inactive to prevent touch input errors that may repeatedly occur when another new input is entered. That is, if a menu bar 20 is enlarged and displayed, only the enlarged menu bar(s) 20 may be executed through a user's touch while other portions of the display are rendered inactive, and thus not executed even though a user may touch the other portions.

In alternative embodiments, if a touch is detected on portions other than the enlarged menu bar(s) 20, the display may be returned to a previous display (such as, for example, FIGS. 6A and 6D) before the menu bar(s) 20 were enlarged, in one embodiment within a predetermined amount of time. In other alternative embodiments, the display may be returned to its previous form if no new touch input is received within a predetermined amount of time.

In still other alternative embodiments, when two menu bars 20 are enlarged, the screen may be divided into two halves, allowing any touch detected on an upper portion to select the upper menu bar 20, while any touch detected on a lower portion to select the lower menu bar.

Next, operation of the touch screen device in accordance with embodiments will be described with respect to the illustrative examples shown in FIGS. 6A-6F.

Figure 6E:
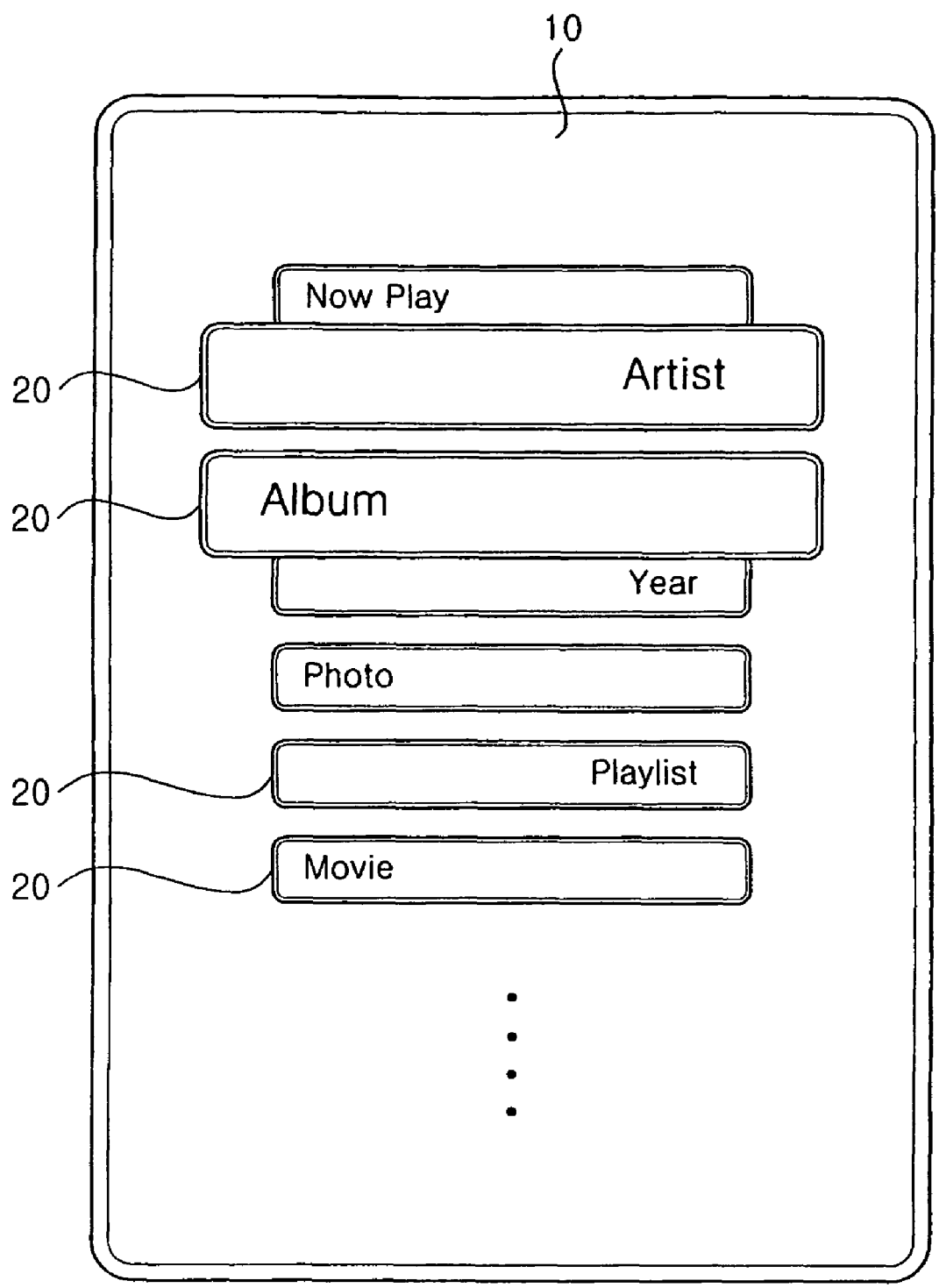
Figure 6F:
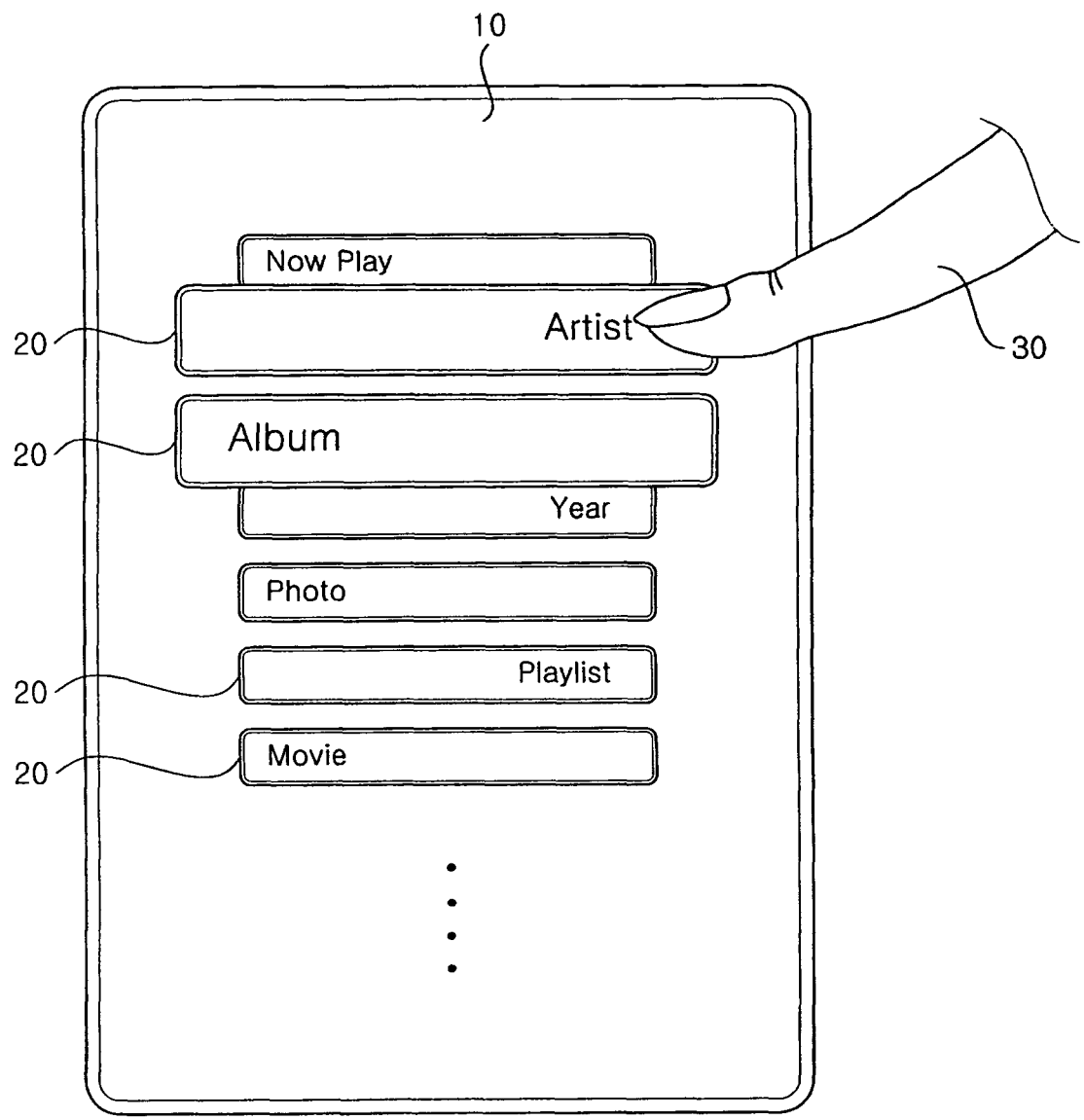

As shown in FIGS. 6A and 6D, input errors occur when a user touches two or more menu bars 20 at the same time. If, for example, two menu bars 20 are touched at the same time, the controller 16 may cause the two menu bars 20 to be enlarged and displayed, as shown in FIGS. 6B and 6E. In this example, it is assumed that neither of the two touched menu bars 20 has a dominant proportion of the whole touch area, or a proportion which is greater than the predetermined proportion of the whole touch area. That is, if one of the touched menu bars 20 has, for example, more than 90% of the whole touch area and the other is small by comparison, the controller 16 may simply execute the menu corresponding to the menu bar 20 which has more than 90%. However, if there are no dominant menu bars 20, the user may easily touch a desired menu bar 20 from among the enlarged and displayed menu bars 20, and the controller 16 executes the newly touched menu.

A touch screen device and a method of displaying and selecting menus in accordance with embodiments broadly described herein may provide at least the following advantages.

One or more menu bars each including an expanded portion to be touched may be displayed on the touch screen device such that the expanded portions are arranged in an alternating pattern. Therefore, more menu bars may be displayed on the touch screen at one time, and a user may more easily select a desired menu bar even though the menu bars are displayed close together on the touch screen device.

Further, the arrangement of menu bars on the touch screen device may be changed in accordance with the number of touches on the menu bars, thus enhancing ease of use of the touch screen device.

Additionally, if input errors are encountered, the menu bars connected with the error may be enlarged and displayed to facilitate a new touch input to correct the errors. Therefore, the input errors can be easily corrected.

The touch screen device in accordance with embodiments may be used in or formed as display for electronic books, newspapers, magazines, etc., different types of portable devices, e.g., handsets, MP3 players, notebook computers, etc., audio applications, navigation applications, televisions, monitors, or other types of devices using a display, either monochrome or color.

Embodiments broadly described herein provide a screen menu configuration for a touch screen device which minimizes the occurrence of input errors. Further, embodiments broadly described herein provide a method of selecting menus in which a user can easily correct touch screen input errors generated when two or more menus are simultaneously touched.

In accordance with one embodiment broadly described herein, there is provided a method of displaying and selecting a plurality of menus on a touch screen device, wherein each of the menus is represented as a menu bar formed with an expanded portion at one side thereof, and the menu bars are displayed in such a manner that the expanded portions are arranged in zigzag. The menu may be executed only by touching the expanded portion. Further, the menu bars may be displayed in a horizontal or vertical direction. Furthermore, at least one of a text or an icon may be displayed on the menu bar. In addition, the menu bars may be arranged in a descending order based on the number of touches on the respective menu bars.

In accordance with another embodiment broadly described herein, there is provided a touch screen device, including a screen unit including a display unit for displaying menu images thereon and a detection unit for detecting a touch on a screen by a user, and a control unit for allowing one or more menu bars, each of which has an expanded portion at one side thereof and represents a selection menu, to be displayed on the screen unit, wherein the control unit causes the menu bars to be displayed on the screen unit such that the expanded portions are arranged in zigzag. In certain embodiments, the touch screen device may also include a count extracting unit for extracting the number of touches on the menu bars. Further, the control unit may change an arrangement order of the menu bars displayed on the screen unit in accordance with the number of touches on the menu bars.

In accordance with another embodiment broadly described herein, there is provided a method of displaying and selecting menus on a touch screen device, including detecting whether a screen is touched, detecting whether two or more menus are touched at the same time, when two or more menus are touched at the same time, displaying the touched menus, and executing a menu corresponding to a new input for one of the displayed menus. In certain embodiments, the method may also include calculating proportions of touched areas of the touched menus to a whole touched area, and, if the proportion of a menu is equal to or greater than a predetermined value, determining that only the menu has been touched to execute the relevant menu. Images of the touched menus may be enlarged and displayed. Further, each of the menus may be represented as a menu bar formed with an expanded portion at one side thereof, and the menu bars may be displayed in such a manner that the expanded portions are arranged in zigzag.

In accordance with still another embodiment broadly described herein, there is provided a touch screen device, including a screen unit including a display unit for displaying menu images thereon and a detection unit for detecting a touch on a screen by a user, and a control unit for controlling operations of the device in accordance with the screen touch detected by the detection unit, wherein the control unit determines whether two or more menus are touched at the same time, causes the menus to be displayed if the two or more menus are touched at the same time, and executes a relevant menu to which a new input is applied. Proportions of touched areas of the touched menus to a whole touched area may be calculated. Then, if the proportion of a specific menu is equal to or greater than a predetermined value, it may be determined that only the menu has been touched. Also, the control unit may cause the two or more detected menus to be enlarged and displayed.

In accordance with another embodiment broadly described herein, there is provided digital equipment provided with a touch screen device which includes a screen unit including a display unit for displaying menu images thereon and a detection unit for detecting a touch on a screen by a user, and a control unit for allowing one or more menu bars to be displayed on the screen unit, the menu bars each having an expanded portion at one side thereof and representing a selection menu, wherein the control unit causes the menu bars to be displayed on the screen unit such that the expanded portions are arranged in zigzag.

In accordance with still another embodiment broadly described herein, there is provided digital equipment provided with a touch screen device which includes a screen unit including a display unit for displaying menu images thereon and a detection unit for detecting a touch on a screen by a user, and a control unit for controlling operations of the device in accordance with the screen touch detected by the detection unit, wherein the control unit determines whether two or more menus are touched at the same time, causes the menus to be displayed if the two or more menus are touched at the same time, and executes a relevant menu to which a new input is applied.

In accordance with embodiments so configured, the occurrence of input errors may be reduced when menus are input through a touch screen device, and the input errors can be easily corrected even when the errors occur.

Embodiments broadly disclosed herein further provide a method of displaying and selecting a plurality of menus on a touch screen device, the method including representing each of the menus as a menu bar including an expanded portion at one end thereof, and displaying the menu bars on the touch screen device such that the expanded portions are arranged in an alternating pattern. The expanded portion of each menu bar may include an active portion of the menu bar through which a corresponding menu selection may be made. A bar portion of each menu bar may include an active portion of the menu bar through which a corresponding menu selection may be made.

The method may further include selecting and executing one of the plurality of menus by touching the expanded portion of the corresponding menu bar. The method may additionally include displaying the menu bars comprises displaying the menu bars in a horizontal or a vertical direction. At least one of text or an icon may be displayed on the menu bar. Further displaying the menu bars may further include arranging the menu bars in a descending order based on a number of touches on the respective menu bars.

Also, the method may include calculating a touch area corresponding to a touch detected on a touch screen of the touch screen device, and executing a menu corresponding to one of the plurality of menu bars if the calculated touch area is greater than a predetermined touch area, or requesting a new touch input if the calculated touch area is less than the predetermined touch area. Requesting a new touch input may include enlarging and displaying two or more of the plurality of menu bars, and requesting a new touch input to select one of the enlarged two or more menu bars.

The method may further include executing an uppermost of the enlarged two or more menu bars if the new touch input is received in an upper half of the touch screen, and executing a lowermost of the enlarged two or more menu bars if the new touch input is received in a lower half of the touch screen. Additionally, the method may further include returning to a previous arrangement of the plurality of menu bars if the new touch input is not received within a predetermined amount of time. Also, the method may further include returning to a previous arrangement of the plurality of menu bars if the new touch input is received in any area outside of an active area of the enlarged two or more menu bars within predetermined amount of time.

Embodiments broadly disclosed herein further provide a touch screen device, including a screen including a display configured to display menu images thereon and a detector configured to detect a touch on a screen; and a controller configured to display one or more menu bars, the menu bars each having an expanded portion at one end portion thereof and the menu bars each representing a corresponding selection menu, wherein the controller is configured to display the menu bars on the screen such that the expanded portions are arranged in an alternating pattern. The device may further include a count extractor configured to count a number of touches on the menu bars. The controller may be configured to change an arrangement order of the menu bars displayed on the screen in accordance with the number of touches on the menu bars.

Embodiments broadly described herein also provide a method of displaying and selecting menus on a touch screen device, the method including detecting an initial touch input on a screen, detecting whether two or more menus are touched at the same time, when two or more menus are touched at the same time by the initial touch input, displaying the two or more touched menus, and executing a menu corresponding to a new touch input for one of the displayed menus. The method may further include calculating proportions of touched areas of the two or more touched menus to a whole touch area; and if the proportion of a touched area of a menu is greater than or equal to a predetermined value, determining that only that menu has been touched and executing the corresponding menu.

Displaying the two or more touched menus may include enlarging images of the two or more touched menus. Each of the menus may be represented as a menu bar including an expanded portion formed at one end thereof, and the menu bars may be displayed such that the expanded portions are arranged in a zigzag pattern.

The expanded portions may include active portions of the corresponding menus. Bar portions of the menus may also include active portions of the corresponding menus.

Embodiments broadly described herein also provide a touch screen device, including a screen including a display configured to display menu images thereon and a detector configured to detect an initial touch input; and a controller configured to control operation of the device based on the initial touch input detected by the detector, wherein the controller is further configured to determine whether two or more menus are touched at the same time, to display the two or more menus if two or more menus are touched at the same time, and to execute a selected menu when a new touch input is detected. The controller may be configured to calculate proportions of touched areas of the touched menus to a whole touch area and, if the proportion of a specific menu is greater than or equal to a predetermined value, to determine that only the specific menu has been touched. The controller may be configured to enlarge and display the two or more menus.

Digital equipment may comprise the touch screen device. The digital equipment may comprise an MP3 player, a PMP, a PDA, a mobile telephone, a notebook computer, or a portable navigation terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings and the appended claims without departing from the spirit of the disclosure. In addition to variations and modifications in the component parts and/or arrangements, alternative uses will also be apparent to those skilled in the art.

What is claimed is:

1. A method of displaying and selecting a plurality of menus on a touch screen for a portable terminal, the method comprising:

displaying a plurality of menu bars corresponding to the plurality of menus such that the plurality of menu bars are arranged extending sequentially in either a horizontal direction or a vertical direction on the touch screen;

receiving a touch on two or more of the plurality of menu bars on the touch screen; and executing a menu corresponding to a specific menu bar of the two or more of the plurality of menu bars if a first touch area of the touch within the specific menu bar is greater than a second touch area of the touch within each of the rest of the two or more of the plurality of menu bars by a predetermined proportion, and requesting a new touch input if the first touch area is not greater than the second touch area by the predetermined proportion, wherein each of the plurality of menu bars includes an expanded portion formed at one end thereof.

2. The method of claim 1, wherein displaying the plurality of menu bars comprises displaying the plurality of menu bars such that the expanded portions are arranged in an alternating pattern.

3. The method of claim 2, wherein an expanded portion formed on a left end of one of the menu bars is interposed between expanded portions formed on a right end of adjacent menu bars if the plurality of menu bars are disposed horizontally on the touch screen.

4. The method of claim 2, wherein an expanded portion formed on a top end of one of the menu bars is interposed between expanded portions formed on a bottom end of adjacent menu bars if the plurality of menu bars are disposed vertically on the touch screen.

5. The method of claim 2, wherein executing a menu corresponding to the specific menu bar comprises detecting a touch in an expanded portion of at least one of the plurality of menu bars, and executing a menu corresponding to the touched expanded portion.

6. A touch screen device for a portable terminal, comprising:

a touch screen configured to display a plurality of menu bars corresponding to a plurality of menus in the portable terminal such that the plurality of menu bars are arranged extending sequentially in either a horizontal or vertical direction thereon, and to detect a touch on active areas of two or more of the plurality of menu bars; and a controller configured to execute a menu corresponding to a specific menu bar of the two or more of the plurality of menu bars if a first touch area of the touch within the active area of the specific menu bar is greater than a second touch area of the touch within the active area of each of the rest of the two or more of the plurality of menu bars by a predetermined proportion, and to request a new touch input if the first touch area is not greater than the second touch area by the predetermined proportion, wherein each of the plurality of menu bars includes an expanded portion formed at one end thereof.

7. The device of clam 6, wherein the plurality of menu bars are displayed such that the expanded portions are arranged in an alternating pattern.

8. The device of claim 7, wherein an expanded portion formed on a left end of one of the menu bars is interposed between expanded portions formed on a right end of adjacent menu bars if the plurality of menu bars are disposed horizontally on the touch screen, and an expanded portion formed on a top end of one of the menu bars is interposed between expanded portions formed on a bottom end of adjacent menu bars if the plurality of menu bars are disposed vertically on the touch screen.

* * * * *